Sept. 6, 1938.  H. I. WATERMAN ET AL  2,129,596
TREATMENT OF SOLIDS
Filed May 4, 1934
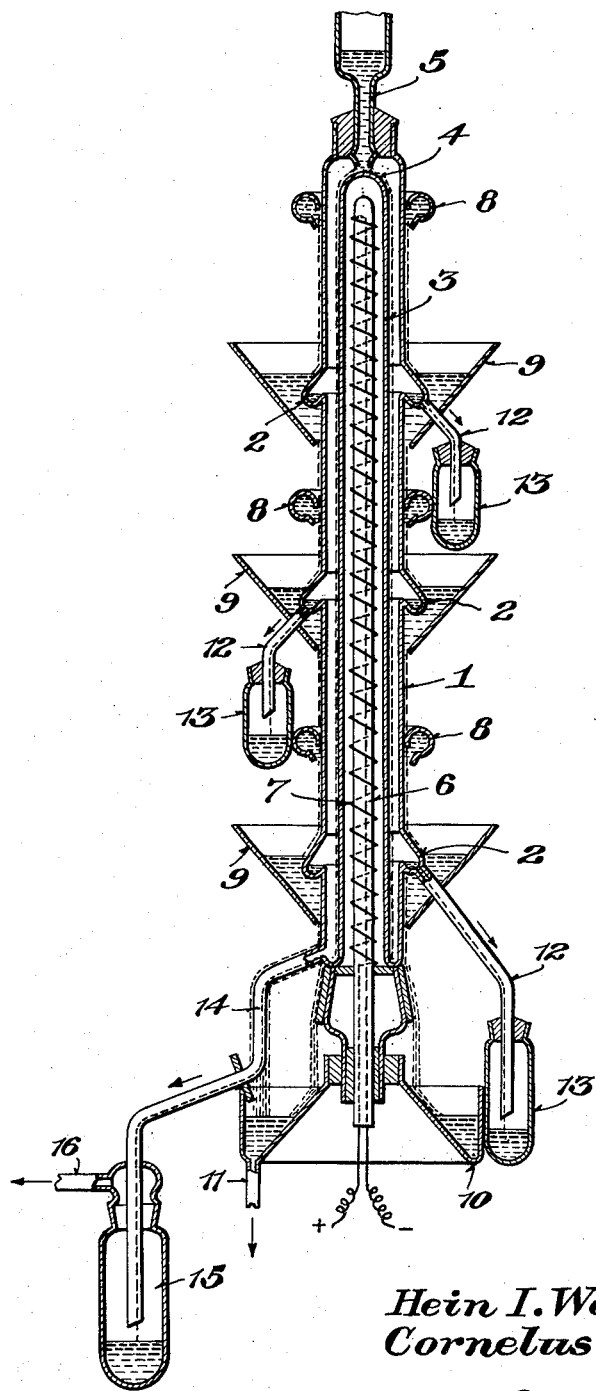
Inventors
Hein I. Waterman,
Cornelus van Vlodrop,
By K. P. McElroy.
Attorney Patented Sept. 6, 1938

2,129,596

UNITED STATES PATENT OFFICE 2,129,596

TREATMENT OF SOLIDS

Hein Israel Waterman, Delft, and Cornelus Van Vlodrop, Rotterdam, Netherlands, assignors to Imperial Chemical Industries Limited, a corporation of Great Britain Application May 4, 1934, Serial No. 723,992 In the Netherlands May 9, 1933

21 Claims. (Cl. 202—52)

This invention relates to treatment of solids; and it comprises a method of distilling solid substances under high vacuum wherein the solid is admixed in finely divided condition with an inert medium in the proper amount and of the proper character to form a free flowing mixture at distilling temperatures and the mixture is flowed over heated surfaces in close proximity to cooled surfaces under a high vacuum of the order of 0.01 mm. of mercury or less and the distillate and the stripped medium are separately collected from said surfaces; all as more fully hereinafter set forth and as claimed.

There are many cases in which normally solid materials are to be isolated or recovered in which ordinary methods such as those using solvents, are inapplicable or undesirable for one reason or another. Where such solids have any vapor tension at any temperature below the decomposition point, as we have found, isolation or recovery can often be effected by "evaporative distillation". Most of these solids are however not good heat conductors and in the finely divided state required to give large evaporative surface they are as a matter of fact good heat insulators. It is difficult to heat them to any exact uniform temperature, to introduce them into and remove them from high vacuum apparatus or to operate in any continuous manner.

We have now found it possible to overcome these difficulties by relatively simple means, and our improved process can readily be carried out as a batch or a continuous process, as desired.

According to the invention the solid matter to be distilled or fractionated by distillation is suspended, preferably in a finely ground condition, or dissolved in a liquid medium, which may be non-volatile or partially volatile or completely volatile at the temperature and pressure to be employed thereby making a free flowing mixture which may be handled like a liquid. This mixture is subjected to treatment in film form. A solid diluent which is easily melted and maintained in the liquid condition may be used in place of the liquid medium. The medium selected is generally a substance inert with respect to the solid substance. The suspension or solution is then submitted to evaporative or molecular distillation at suitably raised temperature in a very high vacuum e. g. a vacuum of the order of the cathode vacuum: 0.01 to 0.0001 mm. of mercury.

The terms "evaporative" and "molecular" distillation will be understood from the following explanatory note. When a liquid is maintained at a suitable temperature (below the boiling-point at the particular pressure used) there is a tendency for molecules at or near the surface to leave that surface. If these molecules impinge upon a cooled condenser surface they lose velocity and may be retained on the condenser surface. The majority of such molecules are in fact retained when the square root of the total area of liquid surface and/or condensing surface is large compared with the distance between the surfaces. Distillation proceeds continuously in such circumstances, and as it is unaccompanied by ebullition, it is known as "evaporative disti"ation". The process is usually carried out in a high vacuum, and if the vacuum is high enough and the distance between liquid surface and condensing surface is less than the mean free path of the evaporated molecules at the temperature used, the process becomes what is known as "molecular distillation".

When a non-volatile diluent is used in our invention, the solid or that portion of the solid which is volatile under these conditions distils or sublimes on to the condenser surface and must be removed continuously or from time to time.

Preferably, however, the diluent is at least partly volatile, so that sufficient distils to act as a solvent or as a suspension medium for the distilled or sublimed solid. The total distillate can then be handled in film form; it is thus enabled to flow down the condenser surface and is easily collected. The diluent or carrier medium should ordinarily be somewhat less readily volatile than the solid substance, to prevent thickening of the mixture.

If the diluent is completely volatile it serves equally well as a medium for the distilled or sublimed solid, but the residue on the distilling surface will be, at least in part, solid and must be removed continuously or from time to time. With a suspension of fine solid in an inert liquid medium of less vapor tension the mixture does not become thicker as the solid is removed.

The removal of solid distillate, sublimate or residue may be effected by flushing the surface with a substantially non-volatile liquid, or by a suitable scraper. A suitable evaporative still having scrapers for removing non-fluent distillation products is disclosed and claimed in a copending application of Eric W. Fawcett et al., Ser. No. 9,873, filed March 7, 1935.

Arrangements may be made for collecting the distillate in successive fractions. This may be done, for example, by changing the receiver (which may be of the Bruhl or other vacuum fractionation type) at suitable intervals of time or of temperature rise. Preferably, however, the condensing surface is provided with separate collecting means at intervals along its length. Such an arrangement is shown in the accompanying drawing.

In the drawing (1) is a vertical outer tube with annular pockets or bulges (2) spaced along its length. The inner tube (3) has a rounded closed upper end (4) which serves to distribute the distilland over the outer surface of the inner tube (3). The distilland, namely the suspension or solution of solid to be distilled, enters the apparatus at (5) and flows in a thin stream down the outside of the inner tube (3), which contains a heater, shown in the drawing as an electrical resistance (7) supported on a columnar insulating support (6). The outer tube (1) is cooled externally by means of a series of water rings (8), the annular pockets (2) being surrounded by funnels (9). Heat transfer from the heating element to the thin stream or film of liquid mixture is effective and uniform. The solid particles are heated equally, to the desired temperature. The outer tube (1) is thus cooled by a flow of running water over its outer surface, the water being collected by the annular vessel (10) from which it runs off through the outlet (11).

The annular pockets (2) are provided with outlets (12) leading to collecting vessels (13) for the several fractions. The residue undistilled passes from the lower end of the inner tube (1) through a lead (14) to a collecting vessel (15). Vacuum is applied to the outlet (16).

The valuable product may be the distilled or sublimed solid or the residual solid. Where it is obtained dissolved or suspended in liquid or solidified liquid diluent, separation of the valuable product may be effected by known means, such as extraction, centrifuging, filtration or the like.

The new technique is of very wide application, not only to production of solids by the distillation or fractionation of solids, but also to the production of liquid, or liquid and solid, fractions by distillation of solid starting-materials which may contain liquid fractions as such or may be converted chemically into liquid products. The main application of the invention is however in the purification of solids or their isolation from admixture with other solids.

Examples of the application of our invention include the isolation or concentration of solid active ingredients from plants and herbs or parts thereof, or from animal substances. For example we can obtain from placenta a concentrated form of female sex-hormone contained in the placenta by molecular distillation of finely divided placenta dispersed in oil.

Solid alkaloids usually regarded as non-volatile, such as caffeine may be recovered in pure form under the present invention, avoiding the usual more tedious physical and chemical processes. Fine ground tea or coffee is suspended in oil and transmitted through the still, the alkaloids distilling over and being condensed. If the carrier liquid be an oil partially volatile under the distillation conditions the condensate also contains volatilized oil and can be removed in admixture therewith. The alkaloid is pure; it does not contain other and non-volatile portions of the vegetable matter. The temperatures are too low to cause any destructive distillation and contamination of the condensate thereby.

Solid dyestuffs and intermediates can be purified or isolated from solid mixtures containing them. For example, pure madder can be distilled from a suspension of ground madder in oil.

By converse procedure, desired solid materials containing undesired more volatile impurities can be purified by making up a solution or suspension of such solid in a carrier and subjecting the mixture to molecular distillation under such conditions as to volatilize only the impurities and perhaps a portion of the carrier medium. For example, unwanted volatile by-products or impurities can be distilled from solutions or suspensions of phenol-aldehyde or other synthetic or natural resins in diluents of suitably high boiling points, e. g. one of the mineral oil or vegetable oil preparations described post.

Phenol-aldehyde resins are made by the reaction of formaldehyde on a phenol, which may be phenol itself or a cresol, in various proportions; the proportions depending to a certain extent upon the properties wanted. These resins are often used in varnish bases. The phenols are bodies of strong odor and there is often a slight excess either of formaldehyde or of phenol in the resin. These resins may be purified of such volatile impurities by the present process, making possible the production of varnish bases without objectionable odor. The impurities in these resins are quite volatile and it is not necessary to use high temperatures in removing them; temperatures high enough to further harden the resin.

In all cases, with proper adjustment of conditions there is no destructive action upon the desired solid substance.

It will be understood from the foregoing description that a large variety of suspension media or solvents may be used. In the preferred method of working a medium is chosen with which the solid to be distilled may readily be incorporated, and which itself distils sufficiently rapidly, under the conditions employed, to provide enough liquid condensate to wash down (or dissolve) the distilled solid. By this means the use of scrapers or of a special wash liquid to remove the distilled solid from the condenser walls is rendered unnecessary.

Suitable media are high-boiling or non-volatile mineral oil fractions or vegetable oils such as linseed oil or stand oil. For some purposes it is desirable to free ordinary stand oil from readily volatile matter by distillation under high vacuum, before it is employed as a carrier medium in the present process.

In freeing phenol-aldehyde and similar synthetic resins of volatile impurities, the use of a vegetable oil carrier liquid rather than mineral oil presents the advantage that the vegetable oil can constitute the vehicle for a varnish. For example, a crude phenol-aldehyde resin can be incorporated in linseed oil stand oil and subjected to distillation as described. The volatile impurities are evaporated off, condensed and removed, leaving the purified resin directly incorporated in oil as a varnish.

The invention is further illustrated but not limited by the following examples of specific embodiments of the invention.

Example 1

Crude beta-aminoanthraquinone (M. P. about 297° C.) to be purified is mixed with about an equal weight of a heavy mineral oil fraction of the type obtained by high vacuum distillation and which oil is non-distillable under the conditions which obtain in the still. The fluent mixture is fed to the heating surface, maintained at about 120° C., of the still, and the distillation is carried out under high vacuum, of the order of 10⁻⁵ m. m. of mercury, the heating and condensing surfaces within the still being in very close proximity, of the order of 1 or 2 cm. The solid distillate is pure beta-aminoanthraquinone (M. P. 311° C.), the associated impurities remaining in the residue and being removed incorporated with the non-volatile oil. The distillate is removed from the condensing surface by scraping.

Example 2

The same initial material as used in Example 1 is mixed with about an equal weight of a mineral oil fraction prepared as described, which is completely distillable at about 140° C. The heating surface is maintained at about this temperature. The fluent mixture is fed to the heating surface and high vacuum is applied as described. In this case the solid portion of the distillate, pure beta-aminoanthraquinone is obtained incorporated with the oil and the mixture of distillate and liquid medium is withdrawn from the still. The tarry solid or semi-solid impurities remain as residue on the heating surface and are removed suitably by flushing or scraping.

Example 3

Purification of crude o-anisidide of β-oxynaphthoic acid. As a suitable liquid medium we use a linseed oil stand oil, about 30% of which is volatile at around 200° under high vacuum. The mixture of raw material and stand oil is fed to a surface in high vacuum heated to about 200° and is distilled, the distillate being condensed on to a condensing surface in very close proximity, of the order of 1 or 2 cm. to the distilland surface. The residue and distillate, both of which contain solid and liquid constituents, the solid portion of the distillate being the desired purified material, are removed from the apparatus and the solids separated from the liquids in a suitable manner. The solid residue or solid distillate may be further fractionated if necessary, while the liquid residue and liquid distillate may be used again for the treatment of a further quantity of raw material. The operation as a whole may be carried out as a batch or continuously.

We claim:—

1. Process for the isolation of female sex-hormone which comprises incorporating finely divided placenta in a medium, which is at least partially volatile at the temperature and pressure to be employed, so as to form a mixture fluid at the temperature to be used, submitting the fluid mixture to evaporative distillation at a suitably raised temperature below the decomposition temperature of the hormone and in a very high vacuum and condensing a distillate including some of the medium.

2. Process for the isolation of female sex-hormone which comprises incorporating finely divided placenta in a medium, which is at least partially volatile at the temperature and pressure to be employed, so as to form a mixture fluid at the temperature to be used, submitting the fluid mixture to molecular distillation at a suitably raised temperature below the decomposition temperature of the hormone and in a very high vacuum and condensing a distillate including some of the medium.

3. Process for the isolation of solid alkaloidal substances which comprises incorporating finely divided plant parts in a medium which is at least partially volatile at the temperature and pressure to be employed, so as to form a mixture fluid at the temperature to be used, submitting the fluid mixture to evaporative distillation at a suitably raised temperature below the decomposition temperature of the alkaloidal substance and in a very high vacuum and condensing a distillate including some of the medium.

4. Process for the isolation of solid alkaloidal substances which comprises incorporating finely divided plant parts in a medium which is at least partially volatile at the temperature and pressure to be employed, so as to form a mixture fluid at the temperature to be used, submitting the fluid mixture to molecular distillation at a suitably raised temperature below the decomposition temperature of the alkaloidal substance and in a very high vacuum and condensing a distillate including some of the medium.

5. Process for the isolation or purification of solid organic compounds of the class consisting of dyestuffs and dyestuff intermediates, which comprises incorporating an impure organic compound of that class in a medium, which is at least partially volatile at the temperature and pressure to be employed, so as to form a mixture fluid at the temperature to be used, submitting the fluid mixture to evaporative distillation at a suitably raised temperature below the decomposition temperature of the compound and in a very high vacuum and condensing a distillate including some of the medium.

6. Process for the isolation or purification of solid organic compounds of the class consisting of dyestuffs and dyestuff intermediates, which comprises incorporating an impure organic compound of that class in a medium, which is at least partially volatile at the temperature and pressure to be employed, so as to form a mixture fluid at the temperature to be used, submitting the fluid mixture to molecular distillation at a suitably raised temperature below the decomposition temperature of the compound and in a very high vacuum and condensing a distillate including some of the medium.

7. Process for the isolation or purification of solid dyestuffs, which comprises incorporating an impure organic compound of that class in a medium, which is at least partially volatile at the temperature and pressure to be employed, so as to form a mixture fluid at the temperature to be used, submitting the fluid mixture to evaporative distillation at a suitably raised temperature below the decomposition temperature of the compound and in a very high vacuum and condensing a distillate including some of the medium.

8. Process for the isolation or purification of solid dyestuffs, which comprises incorporating an impure organic compound of that class in a medium, which is at least partially volatile at the temperature and pressure to be employed, so as to form a mixture fluid at the temperature to be used, submitting the fluid mixture to molecular distillation at a suitably raised temperature below the decomposition temperature of the compound and in a very high vacuum and condensing a distillate including some of the medium.

9. Process for the isolation or purification of solid dyestuff intermediates which comprises incorporating an impure organic compound of that class in a medium, which is at least partially volatile at the temperature and pressure to be employed, so as to form a mixture fluid at the temperature to be used, submitting the fluid mixture to evaporative distillation at a suitably raised temperature below the decomposition temperature of the compound and in a very high vacuum and condensing a distillate including some of the medium.

10. Process for the isolation or purification of solid dyestuff intermediates which comprises incorporating an impure organic compound of that class in a medium, which is at least partially volatile at the temperature and pressure to be employed, so as to form a mixture fluid at the temperature to be used, submitting the fluid mixture to molecular distillation at a suitably raised temperature below the decomposition temperature of the compound and in a very high vacuum and condensing a distillate including some of the medium.

11. Process for the distillation of solid substances containing at least partially vaporizable portions under heat and reduced pressure which comprises admixing the solid substance with a medium such as to form a fluid at the temperature of distillation, feeding the mixture to the hot surface of an evaporative still and submitting the fluent mixture to evaporative distillation at an elevated temperature somewhat below the boiling point of the mixture and in a high vacuum sufficient to cause volatilization of vaporizable portions of the solid substance and condensing the distillate, the medium providing efficient heat transfer to the solid in the vacuum.

12. The process of claim 11 wherein the vacuum is of the order of the cathode vacuum and the distillate is condensed in a zone separated by less than the average mean free path of the distillate molecules from the zone at which evaporation takes place, thus securing molecular distillation.

13. The process of claim 11 wherein the medium is at least partially volatile under the temperature and pressure conditions obtaining during distillation, so that some of the medium condenses with the evaporated portions of the solid substance and serves as a carrier therefor, and the evaporated solid substance is subsequently removed in admixture with the condensed portion of the medium.

14. The process of claim 11 wherein the medium is substantially non-volatile under the conditions of temperature and pressure obtaining during evaporation, and the vaporizable portion of solid substance alone is evaporated and condensed, and said portion of the solid substance is later removed from the condensing zone mechanically.

15. Process for the distillation of solid substances containing at least partially vaporizable portions under heat and reduced pressure which comprises admixing the solid substance with a medium at least partially volatile under the temperature and pressure conditions obtaining during distillation, feeding the mixture to the hot surface of an evaporative still and submitting the fluid mixture to fractional evaporative distillation at an elevated temperature somewhat below the boiling point of the fluid mixture and in a high vacuum sufficient to cause evaporation of vaporizable portions of the solid substance and condensing the distillate in separate successive fractions, the medium providing efficient heat transfer to the solid in the vacuum.

16. The process of claim 11 wherein the medium is a high boiling mineral oil fraction.

17. The process of claim 11 in which the medium is stand oil.

18. The process of claim 11 in which the medium is stand oil which has been freed by distillation in a high vacuum of matter volatile under the conditions of distillation of the solid substance.

19. Process for the distillation of solid substances containing portions at least partially vaporizable under heat and reduced pressure which comprises admixing the solid substance in finely divided form with a medium such as to form a mixture fluent at the temperature of distillation, feeding the mixture to the hot surface of an evaporative still, and submitting the fluent mixture to evaporative distillation at an elevated temperature somewhat below the boiling point of the mixture and in a high vacuum of the order of the cathode vacuum, to cause volatilization of the vaporizable portions of the solid substances, and condensing the distillate.

20. The process of treating finely divided solid material of low heat conductivity containing constituents having a low but appreciable vapor tension when hot to distill out and recover such a constituent which comprises mixing material with sufficient liquid or low melting inert medium to form a mixture fluent at the temperature of distillation and readily heated throughout, feeding the fluent mixture over a hot surface in a still at a temperature sufficient to volatilize such constituent and collecting and condensing the vapors evolved to recover such constituent.

21. The process of short path, high vacuum distillation of solid distillable material which comprises passing a mixture of solid distillable material dispersed in a non-volatile liquid over a heated surface which is maintained under a high vacuum, condensing vaporized molecules derived from said material upon a condensing surface which is near to the heating surface and which is separated therefrom by substantially free unconstricted space.

HEIN ISRAEL WATERMAN.
CORNELUS VAN VLODROP.